United States Patent
Samuels

(10) Patent No.: US 11,112,872 B2
(45) Date of Patent: Sep. 7, 2021

(54) METHOD, APPARATUS AND COMPUTER PROGRAM FOR USER CONTROL OF A STATE OF AN APPARATUS

(75) Inventor: John Samuels, Tarleton Lacanshire (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 830 days.

(21) Appl. No.: 14/111,380

(22) PCT Filed: Apr. 12, 2012

(86) PCT No.: PCT/IB2012/051794
§ 371 (c)(1),
(2), (4) Date: Oct. 11, 2013

(87) PCT Pub. No.: WO2012/140593
PCT Pub. Date: Oct. 18, 2012

(65) Prior Publication Data
US 2014/0033141 A1    Jan. 30, 2014

(30) Foreign Application Priority Data
Apr. 13, 2011    (GB) .................................... 1106271

(51) Int. Cl.
*G06F 3/01* (2006.01)
*G06F 3/0481* (2013.01)
*G06F 3/0488* (2013.01)

(52) U.S. Cl.
CPC .......... *G06F 3/017* (2013.01); *G06F 3/04883* (2013.01); *G06F 2203/04101* (2013.01)

(58) Field of Classification Search
CPC ................. G06F 3/017; G06F 3/04883; G06F 2203/04101; G06F 3/041; G06F 3/04815
See application file for complete search history.

(56) References Cited

U.S. PATENT DOCUMENTS

| 5,454,043 A | 9/1995 | Freeman |
| 6,088,023 A * | 7/2000 | Louis .................... G06F 1/1616 345/157 |

(Continued)

FOREIGN PATENT DOCUMENTS

| EP | 2 144 148 A2 | 1/2010 |
| EP | 2 175 358 A2 | 4/2010 |

(Continued)

OTHER PUBLICATIONS

International Search Report for Application No. PCT/IB2012/051794; dated Nov. 29, 2012.

(Continued)

*Primary Examiner* — Yongjia Pan
(74) *Attorney, Agent, or Firm* — Alston & Bird LLP

(57) ABSTRACT

A method comprising: performing user input detection using at least a first detector; detecting using at least the first detector a predefined first phase of a predefined user gesture; detecting using at least a second detector a predefined second phase of the predefined user gesture; and responsive to detecting both the predefined first phase and the predefined second phase of the predefined user gesture, switching between operating in a two-dimensional user interface state and operating in a three-dimensional user interface state.

21 Claims, 3 Drawing Sheets

(56) References Cited

U.S. PATENT DOCUMENTS

| | | | |
|---|---|---|---|
| 6,229,542 B1 | 5/2001 | Miller | |
| 6,415,205 B1* | 7/2002 | Myron | G06K 9/00335 340/522 |
| 6,492,979 B1* | 12/2002 | Kent | G06F 3/0414 178/18.01 |
| 6,791,536 B2* | 9/2004 | Keely | 345/161 |
| 6,822,662 B1 | 11/2004 | Cook et al. | |
| 6,977,645 B2* | 12/2005 | Brosnan | G06F 1/1626 345/157 |
| 7,068,256 B1* | 6/2006 | Gettemy | G06F 1/1626 345/156 |
| 7,569,762 B2* | 8/2009 | Baum, Jr. | G10H 1/0083 84/615 |
| 7,620,316 B2* | 11/2009 | Boillot | G06F 3/017 345/156 |
| 7,728,316 B2* | 6/2010 | Fadell | G06F 3/0304 250/559.38 |
| 8,180,114 B2* | 5/2012 | Nishihara | G06F 3/017 382/103 |
| 8,479,122 B2* | 7/2013 | Hotelling | G06F 3/0418 715/767 |
| 8,493,384 B1* | 7/2013 | Reisman | G06F 3/0425 345/419 |
| 8,514,221 B2* | 8/2013 | King | G06F 3/04883 341/20 |
| 8,581,844 B2* | 11/2013 | Ho | G06F 1/1626 345/156 |
| 8,582,037 B2* | 11/2013 | Stern | G06F 3/017 348/208.16 |
| 8,587,526 B2* | 11/2013 | Engelhardt | G06F 3/0416 178/18.04 |
| 8,589,824 B2* | 11/2013 | Hillis | G06F 3/017 382/103 |
| 8,599,265 B2* | 12/2013 | Kim | G06K 9/00355 348/164 |
| 8,635,560 B2* | 1/2014 | Drader | G06F 1/3215 345/173 |
| 8,704,767 B2* | 4/2014 | Dodge | G06F 3/0346 345/158 |
| 8,842,919 B2* | 9/2014 | Katz | G06F 3/017 382/203 |
| 8,891,868 B1* | 11/2014 | Ivanchenko | G06F 3/017 382/168 |
| 9,063,574 B1* | 6/2015 | Ivanchenko | G06F 3/017 |
| 9,131,060 B2* | 9/2015 | Alameh | H04M 1/605 |
| 9,170,676 B2* | 10/2015 | Krulce | G06F 3/0416 |
| 9,176,608 B1* | 11/2015 | Baldwin | G09G 5/00 |
| 9,201,511 B1* | 12/2015 | Spurlock | G06F 3/0317 |
| 9,218,119 B2* | 12/2015 | Gardenfors | G06F 3/005 |
| 9,262,016 B2* | 2/2016 | McGibney | G06F 3/0425 |
| 9,329,703 B2* | 5/2016 | Falkenburg | G06F 3/03545 |
| 9,389,690 B2* | 7/2016 | Li | G06F 1/3287 |
| 9,394,756 B2* | 7/2016 | Roberson | E21B 33/13 |
| 2003/0210286 A1* | 11/2003 | Gerpheide | G06F 3/04847 715/863 |
| 2005/0052427 A1* | 3/2005 | Wu | G06F 3/04883 345/173 |
| 2006/0012580 A1* | 1/2006 | Perski | G06F 3/038 345/173 |
| 2006/0026536 A1* | 2/2006 | Hotelling | G06F 3/0418 715/863 |
| 2007/0177803 A1* | 8/2007 | Elias | G06F 3/04883 382/188 |
| 2008/0158172 A1* | 7/2008 | Hotelling | G06F 1/3231 345/173 |
| 2008/0234935 A1* | 9/2008 | Wolf | G01C 21/16 701/472 |
| 2009/0309851 A1* | 12/2009 | Bernstein | G06F 3/0416 345/174 |
| 2010/0031202 A1* | 2/2010 | Morris | G06F 3/04883 715/863 |
| 2010/0095206 A1 | 4/2010 | Kim | |
| 2010/0104134 A1* | 4/2010 | Wang | G06F 3/0304 382/103 |
| 2010/0110032 A1 | 5/2010 | Kim et al. | |
| 2010/0156813 A1* | 6/2010 | Duarte | G06F 3/0488 345/173 |
| 2010/0241999 A1 | 9/2010 | Russ et al. | |
| 2010/0257447 A1* | 10/2010 | Kim | G06F 3/04883 715/702 |
| 2010/0295772 A1 | 11/2010 | Alameh et al. | |
| 2010/0313050 A1* | 12/2010 | Harrat | G06F 1/3203 713/323 |
| 2010/0321289 A1* | 12/2010 | Kim | G06F 1/1626 345/156 |
| 2011/0134251 A1* | 6/2011 | Kim | H04N 5/232 348/164 |
| 2011/0148786 A1* | 6/2011 | Day | G06F 3/04883 345/173 |
| 2011/0163976 A1* | 7/2011 | Barnhoefer | G06F 1/3203 345/173 |
| 2011/0164029 A1* | 7/2011 | King | G06F 3/04883 345/419 |
| 2011/0173574 A1* | 7/2011 | Clavin | G06F 3/017 715/863 |
| 2011/0180709 A1* | 7/2011 | Craddock | G01J 1/46 250/338.1 |
| 2011/0234543 A1* | 9/2011 | Gardenfors | G06F 3/005 345/175 |
| 2011/0260965 A1* | 10/2011 | Kim | G06F 3/013 345/156 |
| 2011/0296163 A1* | 12/2011 | Abernethy | G06F 1/3203 713/100 |
| 2011/0313768 A1* | 12/2011 | Klein | G06F 3/017 704/251 |
| 2012/0007713 A1* | 1/2012 | Nasiri | G06F 1/1694 340/5.81 |
| 2012/0092286 A1* | 4/2012 | O'Prey | G06F 3/0416 345/174 |
| 2012/0133587 A1* | 5/2012 | Edwards | G06F 3/021 345/168 |
| 2012/0147531 A1* | 6/2012 | Rabii | H04W 52/0254 361/679.01 |
| 2012/0280900 A1* | 11/2012 | Wang | G06F 3/0488 345/156 |
| 2013/0155031 A1* | 6/2013 | Dahl | G06F 3/0412 345/177 |
| 2013/0229508 A1* | 9/2013 | Li | G06F 1/3287 348/77 |

FOREIGN PATENT DOCUMENTS

| | | |
|---|---|---|
| EP | 2 372 515 A2 | 10/2011 |
| WO | WO-01/59540 A2 | 8/2001 |
| WO | WO-2010/076772 A2 | 7/2010 |
| WO | WO-2012/052612 A1 | 4/2012 |
| WO | WO-2012/134583 A2 | 10/2012 |

OTHER PUBLICATIONS

Written Opinion of International Searching Authority for International Patent Application No. PCT/IB2012/051794 dated Nov. 29, 2012, 11 pages.

Office Action for Great Britain Application No. 1106271.8 dated Jun. 8, 2017, 4 pages.

Office Action for Chinese Patent Application No. 2012800232648 dated Nov. 28, 2017, with English summary, 6 pages.

Office Action for Chinese Patent Application No. 2012800232648 dated Apr. 10, 2018, 3 pages.

* cited by examiner

METHOD, APPARATUS AND COMPUTER PROGRAM FOR USER CONTROL OF A STATE OF AN APPARATUS

TECHNOLOGICAL FIELD

Embodiments of the present invention relate to a method, apparatus and computer program for user control of a state of an apparatus.

BACKGROUND

The operation of an apparatus may be represented using a state machine which indicates the various states the apparatus can have and how transitions can occur between states.

In some instances it is desirable for a transition from one state to another state to be in response to user input.

A user may, in some circumstances, have to remember what user input is required to cause a particular state transition. It would then be desirable if the required user input was easily remembered and intuitive.

BRIEF SUMMARY

According to various, but not necessarily all, embodiments of the invention there is provided a method comprising: performing user input detection using at least a first detector; detecting using at least the first detector a predefined first phase of a predefined user gesture; detecting using at least a second detector a predefined second phase of the predefined user gesture; and responsive to detecting both the predefined first phase and the predefined second phase of the predefined user gesture, switching between operating in a two-dimensional user interface state and operating in a three-dimensional user interface state.

According to various, but not necessarily all, embodiments of the invention there is provided a method comprising: enabling a first user gesture detector; enabling a second user gesture detector; and switching from operating in a two-dimensional user interface state to operating in a three-dimensional user interface state only after the first detector has detected a predefined first phase of a predefined user gesture and the second detector has detected the predefined second phase of the predefined user gesture.

According to various, but not necessarily all, embodiments of the invention there is provided an apparatus comprising: at least one processor; and at least one memory including computer program code the at least one memory and the computer program code configured to, with the at least one processor, cause the apparatus at least to perform:
  detecting using input from at least the first detector a predefined first phase of a predefined user gesture;
  detecting using input from at least a second detector a predefined second phase of the predefined user gesture; and
  responsive to detecting both the predefined first phase and the predefined second phase of the predefined user gesture, causing switching between operating in a two-dimensional user interface state and operating in a three-dimensional user interface state.

According to various, but not necessarily all, embodiments of the invention there is provided an apparatus comprising: a first user gesture detector configured to detect at least a first phase of a predetermined user gesture; a second user gesture detector configured to detect at least a second subsequent phase of the predetermined user gesture; control circuitry configured to switch the apparatus from operating in a two-dimensional user interface state to operating in a three-dimensional user interface state after the first detector has detected the predefined first phase of the predefined user gesture and the second detector has detected the predefined second phase of the predefined user gesture.

According to various, but not necessarily all, embodiments of the invention there is provided a method comprising: operating an apparatus in a first state; performing user input detection using at least a first detector; detecting using at least a first detector a predefined first phase of a predefined user gesture; detecting using at least the second detector a predefined second phase of the predefined user gesture; and responsive to detecting using at least the first detector the predefined first phase of the predefined user gesture and responsive to detecting using at least the second detector the predefined second phase of the predefined user gesture, switching from operating the apparatus in the first state to operating the apparatus in a second state.

According to various, but not necessarily all, embodiments of the invention there is provided a method comprising: operating an apparatus in a first state; performing user input detection using at least a first detector; detecting using at least a first detector, but not the second detector, a predefined first phase of a predefined user gesture; detecting using at least the second detector a predefined second phase of the predefined user gesture; and responsive to detecting using at least the first detector the predefined first phase of the predefined user gesture and responsive to detecting using at least the second detector the predefined second phase of the predefined user gesture, switching from operating the apparatus in the first state to operating the apparatus in a second state.

According to various, but not necessarily all, embodiments of the invention there is provided an apparatus comprising:
  means for performing user input detection using at least a first detector;
  means for detecting using at least the first detector a predefined first phase of a predefined user gesture;
  means for detecting using at least a second detector a predefined second phase of the predefined user gesture; and
  means responsive to detecting both the predefined first phase and the predefined second phase of the predefined user gesture, for switching between operating in a two-dimensional user interface state and operating in a three-dimensional user interface state.

BRIEF DESCRIPTION

For a better understanding of various examples of embodiments of the present invention reference will now be made by way of example only to the accompanying drawings in which:

A method, apparatus and computer program for user control of a state of an apparatus.

DETAILED DESCRIPTION

Figure 1:
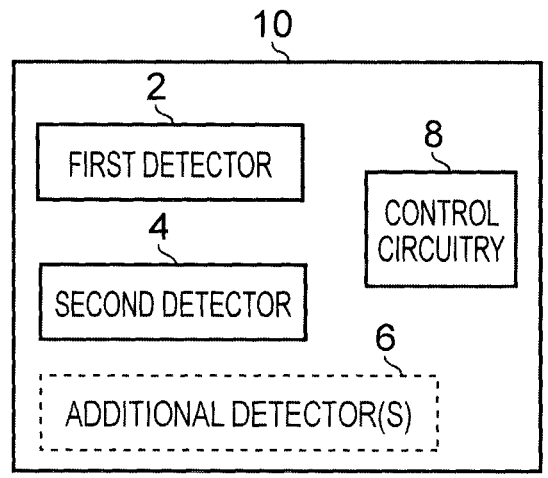
FIG. 1 illustrates an apparatus comprising a first detector, a second detector and control circuitry.

The Figures illustrate an apparatus 10 comprising: a first (user gesture) detector 2 configured to detect at least a first phase 5 of a predetermined user gesture; a second (user gesture) detector 4 configured to detect at least a second subsequent phase 7 of the predetermined user gesture; and control circuitry 8 configured to switch the apparatus 10 from operating in a two-dimensional user interface state to operating in a three-dimensional user interface state after both the first detector 2 has detected the predefined first phase 5 of the predefined user gesture and the second detector 4 has detected the predefined second phase 7 of the predefined user gesture. The control circuitry 8 may be configured to save energy by enabling the second detector 4 only after the first detector 2 has detected the predefined first phase 5 of the predefined user gesture.

The Figures also illustrate a method 30 comprising: operating 31 in a two-dimensional user interface state; performing 32 user input detection using at least a first detector 2; detecting 33 using at least the first detector 2 a predefined first phase of a predefined user gesture; detecting 35 using at least the second detector 4 a predefined second phase of the predefined user gesture; and responsive to detecting both the predefined first phase and the predefined second phase of the predefined user gesture, switching from operating in a two-dimensional user interface state to operating in a three-dimensional user interface state. User input detection using at least the second detector 4 may be enabled in response to detecting using at least the first detector 2 the predefined first phase of the predefined user gesture.

FIG. 1 illustrates an apparatus 10 comprising a first detector 2; a second detector 4 and control circuitry 8.

The apparatus 10 may be a portable apparatus. It may, for example be a hand-portable apparatus which is an apparatus sized to be carried in a palm of a user's hand or within a user's jacket pocket. The apparatus 10 may comprise additional circuitry and components that are not illustrated and may perform functions additional to those described below. The apparatus 10 may for example operate as a media player and/or a communications device and/or a media recording device and/or a navigation device and/or a storage device and/or a client device etc.

The control circuitry 8 is configured to enable switching between a two-dimensional user interface state and a three-dimensional user interface state. The switching occurs when a user performs a gesture (see FIG. 2 for an example) that has a first phase 5 followed by a second phase 7. The gesture is predefined as are the first phase 5 and the second phase 7.

A gesture involves the movement of an object. The object has a displacement d(t) in a co-ordinate system and the gesture is defined by the trajectory of the movement, that is, how d(t) changes in time. The object may, for example, be any item whose trajectory may be tracked using the first detector 2 and the second detector 4. It may, for example, be a user's hand or hands a user's digit or digits or it may, for example, be an object worn or held by a user.

A gesture may be divided into phases (time periods) that may be distinct and non-overlapping. A first phase precedes a second phase. The second phase may immediately follow the first phase or there may be a time interval between the first phase and the second phase.

The first phase may, for example occur in a first time segment between a time t1 and a time t2 and the second phase may, for example, occur is a contiguous following time segment between times t2 and t3.

The first detector 2 is configured to detect at least a first phase 5 of a predetermined user gesture. Detect in this context means that the detector performs measurements that can be used to identify or recognize that the first phase 5 of the predetermined gesture has been completed. The first detector 2 may, or may not, be configured to process those measurements to identify or recognize that the first phase 5 of the predetermined gesture has been completed.

The first detector 2 may not be able to accurately detect the second phase 7 of the predefined gesture.

However, the second detector 2 is configured to detect at least the second phase 7 of the predetermined user gesture. Detect in this context means that the detector performs measurements that can be used to identify or recognize that the second phase 7 of the predetermined gesture has been completed. The second detector 4 may, or may not, be configured to process those measurements to identify or recognize that the second phase 7 of the predetermined gesture has been completed.

As an example, the predefined gesture may comprise a predefined first phase that comprises movement substantially in a first plane and a predefined second phase that comprises movement substantially outside of the first plane. In this example, the first plane may be a Cartesian plane defined by two orthogonal bases (e.g. x, y) and the first gesture may be defined by (x(t), y(t)). The predefined second phase involves movement with a component parallel to a third base (z), which is orthogonal to the two bases (x,y). The second gesture may be defined by (x(t), y(t), z(t), where at least z(t) varies with time.

In this example, the first detector 2 should be capable of measuring (x,y) or variations in (x,y) when z=0. An example of a suitable first detector is a touch sensitive device such as a touch sensitive display. A touch sensitive device has an input surface. This surface defines a plane within which the predefined first phase 5 of the gesture may be made. In the case of a touch sensitive display, this surface is also a display surface In this example, the second detector 4 should be capable of measuring at least movement substantially outside of the first plane, that is, capable of measuring movement in the third dimension (z) or variations in (z). It may also be capable of measuring three dimensional movement, that is, measuring (x, y, z) or variations in (x, y, z).

An example of a suitable second detector 4 is a proximity detector, which measures a parameter that varies with a separation distance of the object performing the gesture from the apparatus 10.

The proximity detector may be a passive detector. It may for example measure a capacitance value that changes with a separations distance of a user from the apparatus 10.

The proximity detector may alternatively be an active detector. It may for example comprise a transmitter that transmits energy (e.g. sound waves or electromagnetic waves) and measures energy (e.g. sound waves or electromagnetic waves) reflected from the object performing the gesture. Such a proximity detector may, for example, be used to measure a time of flight between the apparatus 10 and the object performing the gesture. This may be achieved by transmitting the energy as a pulse and measuring a time between transmission of the pulse and reception of the reflected pulse. Alternatively, such a proximity detector may, for example, be a Doppler radar comprising a frequency shift detector used to measure a Doppler frequency shift between the frequency of the energy transmitted and the frequency of the energy received.

Another example of a suitable second detector 4 is a location detector that is able to detect a location in three dimensions of the object performing the gesture. Such a second detector may, for example comprise one or more detectors.

For example, a plurality of proximity detectors (e.g. three or more non aligned detectors) may be used to estimate a separation distance from each proximity detector. A knowledge of the separation vectors between the proximity detectors enables the object performing the gesture to be located using trilateration.

For example, a single camera may be used in combination with a proximity detector. The proximity detector is able to position a plane in which the object is located and the camera is able to position the object within that plane.

For example, a plurality of cameras may be used in combination. The cameras are able to position the object performing the gesture by resolving stereoscopic images.

A camera may be a passive device that comprises one or more light sensors for detecting ambient light reflected from or emitted from the object performing the gesture or may be an active device that additionally comprises an emitter for emitting light (e.g. infrared light) for reflection by the object performing the gesture.

As previously mentioned, the control circuitry 8 is configured to enable switching between a two-dimensional user interface state and a three-dimensional user interface state.

A two-dimensional user interface state may be a state of a state machine for the apparatus 10. It may be a state that limits user input to input in two-dimensions, for example, using the first detector 2 as a touch sensitive device. It may also or alternatively be a state that limits output to a user to a two-dimensional representation. For example, a graphical user interface may be presented as a two-dimensional array of icons rather than a three dimensional array of icons. For example, content displayed on a display (not illustrated) may be two-dimensional content rather than three-dimensional content.

A two-dimensional user interface state may be appropriate for applications such as electronic books, email, internet browsing etc.

A three-dimensional user interface state may be a state of a state machine for the apparatus 10. It may be a state that limits user input to input in three-dimensions, for example, using at least the second detector 4 as a three dimensional gesture detector. It may also or alternatively be a state that limits output to a user to a three-dimensional representation. For example, a graphical user interface may be presented as a three-dimensional array of icons rather than a two dimensional array of icons. For example, content displayed on a display (not illustrated) may be three-dimensional content rather than two-dimensional content.

A three-dimensional user interface state may be appropriate for applications such as video playback, and user applications. One example of a user application is a rolodex of contacts.

The control circuitry 8 may be configured to enable switching between a two-dimensional user interface state and a three-dimensional user interface state while an application is running without closing and re-opening the application and while retaining the current context of the application. For example, a rolodex of contacts may be presented in a flat two-dimensional view in the first user interface state and the rolodex of contacts may be presented in a deep three-dimensional view in the second user interface state The first detector 2 is required to be operational during the two-dimensional user interface state because it is used to detect the first phase of the predefined user gesture which a necessary but not a sufficient condition for triggering a transition from the two-dimensional user interface state to the three-dimensional user interface state.

The second detector 4 may not be required to be operational during the two-dimensional user interface state because it is not used to detect the first phase of the predefined user gesture. However, the second detector 4 is required to be operational after detecting the first phase of the predefined user gesture so that the second phase of the predefined user gesture can be detected which causes the transition from the two-dimensional user interface state to the three-dimensional user interface state.

The control circuitry 8 may therefore be configured to selectively enable and disable the second detector 4. The second detector 4 may, for example, be disabled during the first user interface state until the control circuitry 8 recognizes that the first detector 2 has detected the first phase 5 of the predefined user gesture. It then enables the second detector 4 so that the second phase of the predefined user gesture may be detected by the second detector 4 and recognized by the control circuitry 8.

In this context, disable may require that the second detector 4 is switched off or it may require that it is in a low energy consumption mode.

In this context, enable may require that the second detector 4 is switched on or it may require that it is in a high energy consumption mode.

The control circuitry 8 is therefore configured to enable the first user gesture detector 2; to enable the second user gesture detector 4 only after the first detector detects the predefined first phase 5 of the predefined user gesture; and to switch the apparatus from operating in the two-dimensional user interface state to operating in a three-dimensional user interface state when the second detector 4 detects the predefined second phase 7 of the predefined user gesture.

Figure 4:
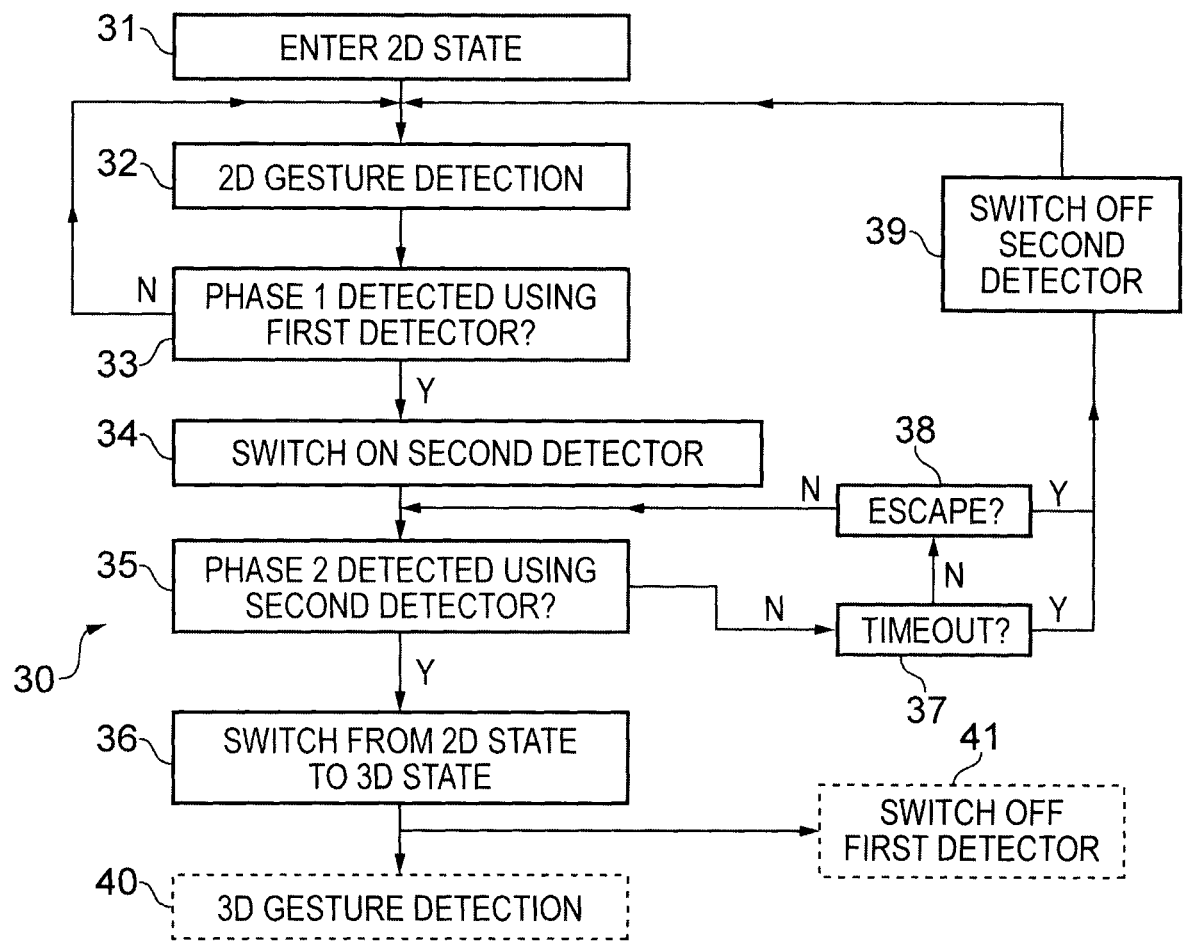
FIG. 4 illustrates a method for effecting a state transition.

FIG. 4 illustrates a suitable method 30.

At block 31, the apparatus 10 is operating in a two-dimensional user interface state.

At block 32, the apparatus 10 performs user input detection using at least the first detector 2 but not using the second detector 4.

At block 33, the apparatus 10 decides whether it has detected, using at least the first detector 2, a predefined first phase 5 of a predefined user gesture.

If the apparatus 10 has detected, using at least the first detector 2, a predefined first phase 5 of a predefined user gesture the method moves to block 34

If the apparatus 10 has not detected, using at least the first detector 2, a predefined first phase 5 of a predefined user gesture the method returns to block 32.

At block 34, the apparatus 10 enables the second detector 4 and performs user input detection using at least the second detector 4.

At block 35, the apparatus 10 decides whether it has detected, using at least the second detector 4, a predefined second phase 7 of a predefined user gesture.

If the apparatus 10 has detected, using at least the second detector 4, a predefined second phase 7 of a predefined user gesture the method moves to block 36.

If the apparatus 10 has not detected, using at least the second detector 4, a predefined second phase 7 of a predefined user gesture the method moves to block 37.

At block 36, the apparatus 10 is switched from operating in the two-dimensional user interface state to operating in a three-dimensional user interface state.

In the three-dimensional user interface state, three dimensional user detection may, optionally occur (block 40).

In the three-dimensional user interface state, the first detector 2 may optionally be disabled (block 41).

Returning to block 37, a return path is provided to block 32 via block 39 and a return path to block 35 is provided via block 38. Block 38 also provides return path to block 32 via block 39.

Block 37 is optional and tests a timeout condition. If when the method moves to block 37 a timer has expired, the method moves from block 37 to block 39 and the timer is reset. If when the method moves to block 37 the timer has not expired, the method moves from block 37 to block 38. The timeout condition allows there to be a delay between the first phase of the predefined gesture and the second phase 7 of the predefined gesture. The delay may be programmed by setting how long it takes for the timer to expire.

Block 38 is optional and tests an escape condition. If when the method moves to block 37 an escape condition is in existence, the method moves from block 38 to block 39 and the condition is reset. If when the method moves to block 38 an escape condition is not in existence, the method moves from block 38 to block 35. The escape condition allows the method to break from waiting to detect the second phase 7, whether or not a timeout is implemented. The escape condition may be programmed.

On example of an escape condition is that the detected first phase 5 is followed by a gesture other than the second phase of the predefined gesture. For example, one escape condition may exist if the first detector 2 detects a user gesture subsequent to the predefined first phase 5 of the predefined user gesture that is not part of the predefined first phase 5 of the predefined user gesture. For example, another escape condition may exist if the second detector 4 detects a user gesture subsequent to the predefined first phase 5 of the predefined user gesture that is not part of the predefined second phase 7 of the predefined user gesture.

At block 39, the second detector 4 is disabled in this example. This stops detection of the predefined second phase 7 of the predefined user gesture.

Figure 2:
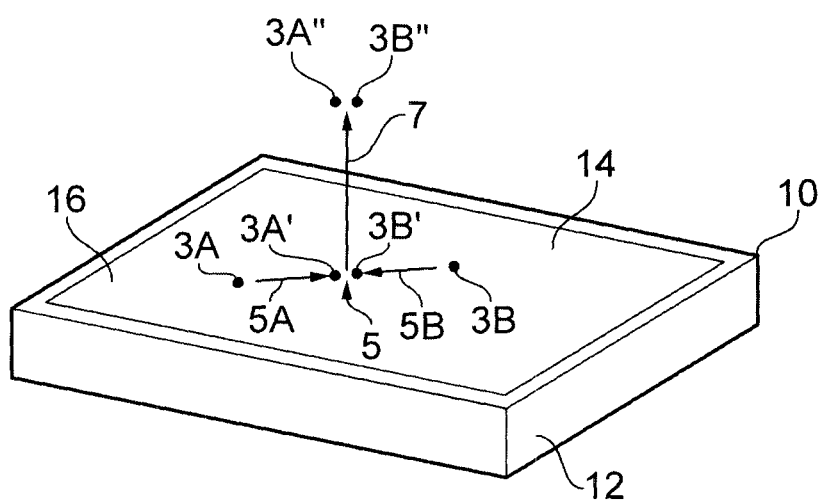
FIG. 2 illustrates an example of an apparatus having a touch sensitive display as a first detector.

FIG. 2 illustrates an example of an apparatus 10 as previously described.

In this example, the apparatus 10 has an exterior housing 12 that presents a touch sensitive display 14. The exterior housing is hand-portable.

The touch sensitive display 14 operates as the first detector 2. It may, for example, be a capacitive or resistive touch sensitive display.

The touch sensitive display 14 has a two-dimensional (Cartesian) surface 16 and it is configured to measure user movement of a point or points of contact over the surface 16.

The second detector 4 is not illustrated and may be positioned behind the touch sensitive display 14. The second detector 4 is configured to measure user movement at least in a direction perpendicular to the two-dimensional surface 16.

The second detector 4 may, for example, comprise a proximity detector and/or a location detector as described previously.

In this example, the predefined first phase 5 of the predefined user gesture comprises movement of two simultaneous points of contact 3A, 3B on the surface 16 of the touch sensitive device 14. In the illustrated example, the first phase 5 of the predefined user gesture comprises relative movement 5A, 5B of the plurality of simultaneous points of contact 3A, 3B on the touch sensitive display 14. The simultaneous points of contact 3A, 3B are moved towards each other until they meet or almost meet 3A', 3B'.

Continuing this example, the predefined second phase 7 of the predefined user gesture comprises movement in a direction not required for the predefined first phase 5 of the predefined user gesture. The predefined second phase 7 of the predefined user gesture comprises movement away from the apparatus 10. The movement, in this example, is substantially perpendicular to the surface 16 of the touch sensitive display 14.

The predefined user gesture illustrated may be performed by a user by placing a thumb tip on the touch sensitive display 14 at, for example, point of contact 3A and placing a tip of a finger on the touch sensitive display 14 at, for example the point of contact 3B. The first phase 5 of the predefined user gesture is achieved by performing a pinch gesture that brings 5A, 5B the thumb tip and finger tip towards each other 3A', 3B' while still in contact with the touch sensitive display 14. The second phase 7 of the predefined user gesture is achieved by immediately performing an extract gesture-moving the pinched thumb tip and finger tip away from the touch sensitive display 14. The predefined gesture comprises in sequence a pinch gesture and an extract gesture—as if the display were being pinched and extracted or pulled outwards.

It may be possible in some embodiments for a user to program the first phase and/or the second phase of the predefined user gesture. For example, the apparatus 10 may learn the predefined user gesture from an example performed by a user. The apparatus then stores the learned gesture so that it is predefined with respect to future use.

Although the predefined user gesture has been described as a gesture with two phases it may have more than two phases.

Figure 5:
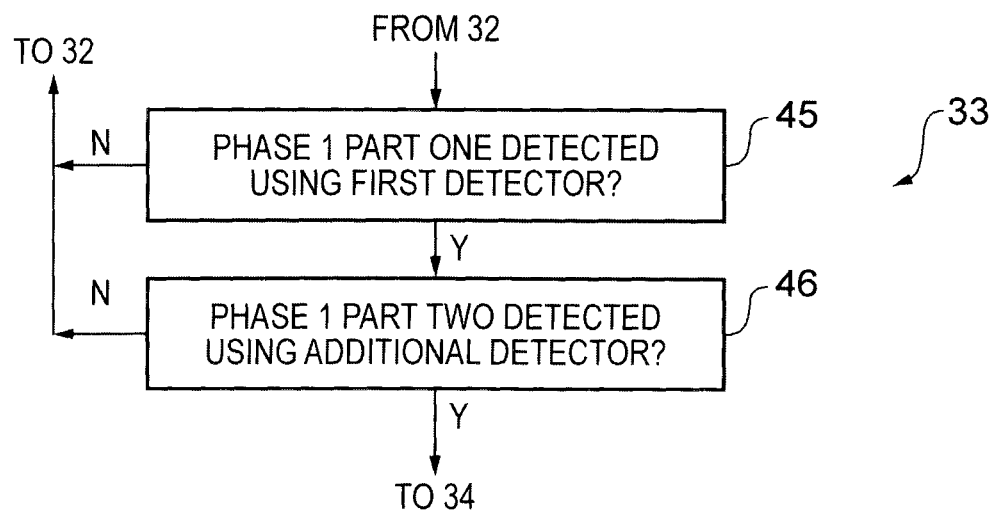
FIG. 5 illustrates another embodiment of the method illustrated in FIG. 4.

FIG. 5 illustrates another embodiment of the method 30. It illustrates a sequence of blocks 45, 46 that may replace block 33 in the method 30 illustrated in FIG. 4.

In FIG. 4, it may be that only the first detector 2 e.g. the touch sensitive display 14 is used to detect the first phase 5 of the predefined gesture. However, in other embodiments an additional detector or detectors 6 (illustrated as optional in FIG. 1) may additionally be used to detect the first phase of the predefined gesture.

For example, the first detector 2 may be used to detect a first part of the first phase of the predefined gesture. If the first detector 2 is a touch sensitive display 14 then the first part may comprise movement of one or more points of contact on the touch sensitive display surface 16.

For example, the additional detector 6 may be used to detect a second part of the first phase of the predefined gesture. The second part of the first phase may involve movement in an additional dimension to movement detected by the first detector 2. If the additional detector is a proximity detector then the second part may comprise movement of the object performing the gesture away from the apparatus 10.

The additional detector may be a low power consumption proximity detector that is less accurate that a high powered second detector 4.

Referring to FIG. 5, block 45 is entered from block 32 of method 30 of FIG. 4. At block 45 if a first part of the first phase of the predefined gesture is detected using the first detector 2 then the method moves to block 46 and if not detected the method moves to block 32 of the method 30 of FIG. 4. At block 46, if a second part of the first phase of the predefined gesture is detected using the additional detector(s) 6 then the method moves to block 34 in FIG. 4 and if not detected the method moves to block 32 in FIG. 4.

Figure 6:
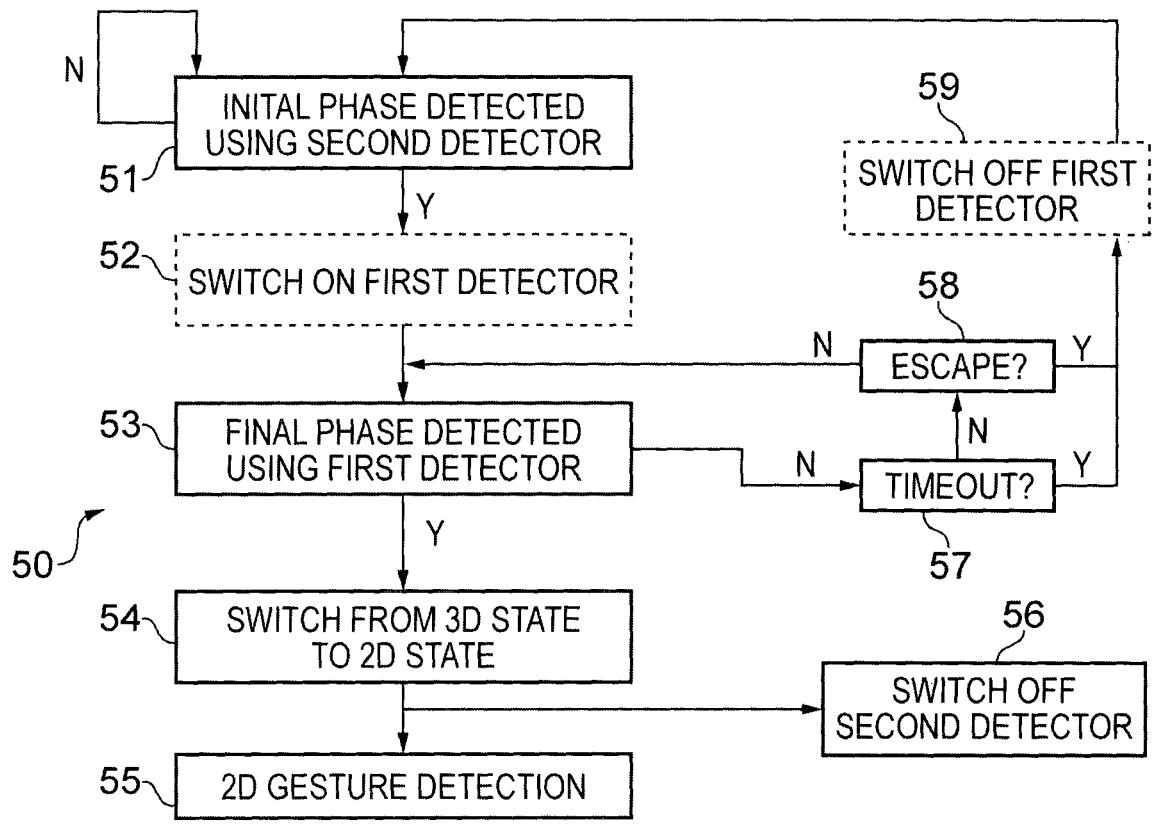
FIG. 6 illustrates a method for effecting another state transition.

FIG. 6 illustrates a method 50 for returning from the three dimensional user interface state to the two-dimensional user interface state.

The apparatus 10 is initially operating in the three-dimensional user interface state.

At block 51 the apparatus performs user input detection using at least the second detector 4.

If the apparatus 10 has detected, using at least the second detector 4, a predefined initial phase of a predefined additional user gesture the method moves to block 52 (or 53).

If the apparatus 10 has not detected, using at least the second detector 4, a predefined initial phase of a predefined additional user gesture the method iterates.

At optional block 52, if the first detector 2 is disabled, it is enabled. The method then moves to block 53.

At block 53, at least the first detector 2 is used to detect a predefined final phase of the additional predefined user gesture.

If the apparatus 10 has detected, using at least the first detector 2, a predefined final phase of the predefined additional user gesture the method moves to block 54.

If the apparatus 10 has not detected, using at least the first detector 2, a predefined final phase of the predefined additional user gesture the method moves to block 57.

At block 54, the control circuitry 8 of the apparatus 10 switches the user interface state from the three-dimensional user interface state to the two-dimensional user interface state.

In the two-dimensional user interface state, two dimensional gesture detection occurs (block 55).

In the two-dimensional user interface state, the second detector 2 may optionally be disabled (block 56).

Returning to block 57, a return path is provided to block 51 via block 59 and a return path to block 53 is provided via block 58. Block 58 also provides a return path to block 51 via block 54.

Block 57 is a timeout block similar to block 37 in FIG. 4. Block 58 is an escape block similar to block 38 in FIG. 4.

Block 59 is optional, at this block the first detector 2 is disabled. This block is generally present if optional block 52 is present.

The predefined initial phase of a predefined additional user gesture may have characteristics similar to the second phase 7 of the predefined gesture previously described except that it is in an opposite sense. For example, the predefined initial phase of the predefined additional user gesture may involve the object defining the gesture moving towards the apparatus 10.

The predefined final phase of the predefined additional user gesture may have characteristics similar to the first phase 5 of the predefined gesture previously described. For example, the predefined final phase of the predefined additional user gesture may involve the object defining the gesture contacting the touch sensitive display 14.

The predefined additional user gesture may, for example, be performed by a user pushing his flat hand or finger tip towards a touch sensitive display 14 (predefined initial phase) until it touches the touch sensitive display (predefined final phase). The predefined additional user gesture comprises in sequence a push gesture and a touch gesture— as if the three-dimensional user interface were being compressed by the user against the display into a two-dimensional user interface.

Implementation of control circuitry 8 can be in hardware alone (a circuit, a processor . . . ), have certain aspects in software including firmware alone or can be a combination of hardware and software (including firmware).

The control circuitry 8 may be implemented using instructions that enable hardware functionality, for example, by using executable computer program instructions in a general-purpose or special-purpose processor that may be stored on a computer readable storage medium (disk, memory etc) to be executed by such a processor.

Figure 3:
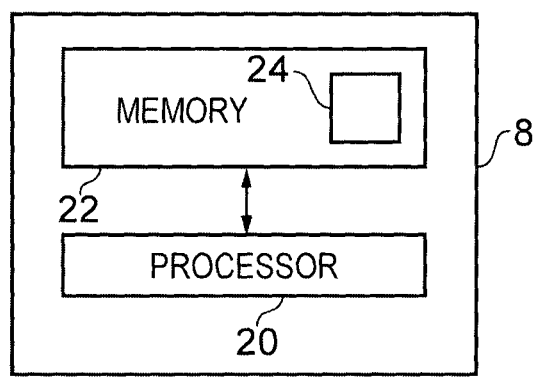
FIG. 3 illustrates an example of control circuitry.

FIG. 3 illustrates on example of control circuitry 8. In this example the processing circuitry 8 comprises a processor 20 and a memory 22.

The processor 20 is configured to read from and write to the memory 22. The processor 20 may also comprise an output interface via which data and/or commands are output by the processor and an input interface via which data and/or commands are input to the processor.

The memory 22 stores a computer program 24 comprising computer program instructions that control the operation of the apparatus 10 when loaded into the processor 20. The computer program instructions 24 provide the logic and routines that enables the apparatus to perform the methods illustrated in FIGS. 4, 5 and 6. The processor 20 by reading the memory 22 is able to load and execute the computer program 24.

According to this example, the apparatus 10 therefore comprises: at least one processor 20; and at least one memory 22 including computer program code 24 the at least one memory 22 and the computer program code 24 configured to, with the at least one processor, cause the apparatus at least to perform:

enabling a first user gesture detector;

enabling a second user gesture detector; and switching from operating in a two-dimensional user interface state to operating in a three-dimensional user interface state after the first detector detects a predefined first phase of a predefined user gesture and the second detector detects a predefined second phase of the predefined user gesture.

The second user gesture detector may be enabled only after the first detector detects a predefined first phase of a predefined user gesture.

Figure 7:
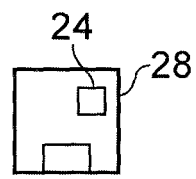
FIG. 7 illustrates a carrier for a computer program.

The computer program 24 may arrive at the apparatus 10 via any suitable delivery mechanism 28 as illustrated in FIG. 7. The delivery mechanism 28 may be, for example, a computer-readable storage medium, a computer program product, a memory device, a record medium such as a compact disc read-only memory (CD-ROM) or digital versatile disc (DVD), an article of manufacture that tangibly embodies the computer program 24. The delivery mechanism may be a signal configured to reliably transfer the computer program 24.

The apparatus 10 may propagate or transmit the computer program 24 as a computer data signal.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As used here 'module' refers to a unit or apparatus that excludes certain parts/components that would be added by an end manufacturer or a user. The control circuitry 8 may be a module as may the first detector 2 and the second detector 4.

The blocks illustrated in the FIGS. 4, 5 and 6 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
performing user input detection using at least a first detector, wherein the at least first detector comprises a touch sensitive device configured to detect touch on a two-dimensional surface;
detecting using at least the first detector a predefined first phase of a predefined user gesture, wherein the predefined first phase of the predefined user gesture comprises movement substantially in a first plane;
enabling at least a second detector;
detecting using at least the second detector a predefined second phase of the predefined user gesture, wherein the predefined second phase of the predefined user gesture comprises movement substantially outside of the first plane;
responsive to detecting both the predefined first phase and the predefined second phase of the predefined user gesture, switching between operating in a two-dimensional user interface state and operating in a three-dimensional user interface state, wherein performing user input detection using at least the first detector comprises performing user input detection using the first detector but not using the second detector; and
wherein enabling at least the second detector comprises: switching on at least the second detector or adjusting at least the second detector from a lower energy consumption mode to a higher energy consumption mode, and wherein enabling at least the second detector is responsive to detecting, using the first detector, the predefined first phase of the predefined user gesture.

2. A method as claimed in claim 1, comprising stopping detecting the predefined second phase of the predefined user gesture after a timeout period without detecting the predefined second phase of the predefined user gesture.

3. A method as claimed in claim 1, comprising stopping detecting the predefined second phase of the predefined user gesture after detecting using at least the first detector a user gesture subsequent to the predefined first phase of a predefined user gesture that is not part of the predefined first phase of the predefined user gesture.

4. A method as claimed in claim 1, wherein the first detector is a touch sensitive display configured to detect touch on a two-dimensional surface of a display.

5. A method as claimed in claim 1, wherein the second detector is selected from the group comprising:
a device configured to measure user movement at least in a direction perpendicular to the two-dimensional surface;
a camera;
a proximity detector;
a device comprising a transmitter, a receiver and a frequency shift detector.

6. A method as claimed in claim 1, wherein the predefined first phase of the predefined user gesture comprises movement of at least one point of contact on the touch sensitive device.

7. A method as claimed in claim 1, wherein the predefined first phase of the predefined user gesture comprises a plurality of simultaneous points of contact on the touch sensitive device.

8. A method as claimed in claim 7, wherein the predefined first phase of the predefined user gesture comprises relative movement of the plurality of simultaneous points of contact on the touch sensitive device.

9. A method as claimed in claim 1, wherein the predefined first phase of the predefined user gesture comprises a pinch gesture on the touch sensitive device.

10. A method as claimed in claim 1, wherein the predefined first phase of the predefined user gesture is user programmable.

11. A method as claimed in claim 1, wherein the predefined second phase of the predefined user gesture is user programmable.

12. A method as claimed in claim 1, comprising:
operating in the three-dimensional user interface state;
performing user input detection using at least the second detector;
detecting using at least the second detector a predefined initial phase of an additional predefined user gesture
detecting using at least the first detector a predefined final phase of the additional predefined user gesture; and
responsive to detecting using at least the first detector the predefined final phase of the additional predefined user gesture, switching from operating in the three-dimensional user interface state to operating in the two-dimensional user interface state.

13. A method as claimed in claim 12, further comprising:
responsive to detecting using at least the first detector the predefined first phase of the predefined user gesture, starting user input detection using at least the second detector.

14. A method as claimed in claim 1, wherein performing user input detection using at least a second detector is in response to detecting using at least the first detector the predefined first phase of the predefined user gesture.

15. A method as claimed in claim 1, wherein performing user input detection using at least a first detector comprises performing user input detection using the first detector and an additional detector but not using a second detector;
wherein detecting using at least the first detector the predefined first phase of the predefined user gesture, comprises detecting using the first detector and the additional detector the predefined first phase of the predefined user gesture; and
wherein performing user input detection using at least the second detector is responsive to detecting, using the first detector and the additional detector, the predefined first phase of the predefined user gesture.

16. A method as claimed in claim 15, wherein the additional detector detects movement in an additional dimension to movement detected by the first detector.

17. A method as claimed in claim 16, wherein the second detector detects movement at least in the additional dimension to movement detected by the first detector but more accurately than the additional detector.

18. A method comprising:
enabling a first user gesture detector, wherein the first user gesture detector comprises a touch sensitive device configured to detect touch on a two-dimensional surface;
enabling a second user gesture detector;
switching between operating in a two-dimensional user interface state and operating in a three-dimensional user interface state only after the first detector has detected a predefined first phase of a predefined user gesture and the second detector has detected the predefined second phase of the predefined user gesture;
wherein enabling the second detector comprises: switching on the second detector or adjusting the second detector from a lower energy consumption mode to a higher energy consumption mode, and wherein enabling the second detector is responsive to detecting, using the first detector, the predefined first phase of the predefined user gesture; and wherein the predefined first phase of the predefined user gesture comprises movement substantially in a first plane and wherein the predefined second phase of the predefined user gesture comprises movement substantially outside of the first plane.

19. An apparatus comprising:
at least one processor; and
at least one memory including computer program code,
the at least one memory and the computer program code configured to, with the at least one processor, cause the apparatus at least to enable:
performing user input detection using at least a first detector, wherein the at least first detector comprises a touch sensitive device configured to detect touch on a two-dimensional surface;
detecting using at least the first detector a predefined first phase of a predefined user gesture, wherein the predefined first phase of the predefined user gesture comprises movement substantially in a first plane;
enabling at least a second detector;
detecting using at least the second detector a predefined second phase of the predefined user gesture, wherein the predefined second phase of the predefined user gesture comprises movement substantially outside of the first plane; and
responsive to detecting both the predefined first phase and the predefined second phase of the predefined user gesture, switching between operating in a two-dimensional user interface and operating in a three-dimensional user interface state;
wherein performing user input detection using at least the first detector comprises performing user input detection using the first detector but not using the second detector; and
wherein enabling at least the second detector comprises: switching on at least the second detector or adjusting at least the second detector from a lower energy consumption mode to a higher energy consumption mode, and wherein enabling at least the second detector is responsive to detecting, using the first detector, the predefined first phase of the predefined user gesture.

20. A hand portable device comprising the apparatus of claim 19.

21. A non-transitory computer readable medium encoded with instructions that, when performed by a least one processor, causes at least the following to be performed:
performing user input detection using at least a first detector, wherein the at least first detector comprises a touch sensitive device configured to detect touch on a two-dimensional surface;
detecting using at least the first detector a predefined first phase of a predefined user gesture, wherein the predefined first phase of the predefined user gesture comprises movement substantially in a first plane;
enabling at least a second detector;
detecting using at least the second detector a predefined second phase of the predefined user gesture, wherein the predefined second phase of the predefined user gesture comprises movement substantially outside of the first plane;
responsive to detecting both the predefined first phase and the predefined second phase of the predefined user gesture, switching between operating in a two-dimensional user interface state and operating in a three-dimensional user interface state, wherein performing user input detection using at least the first detector comprises performing user input detection using the first detector but not using the second detector; and
wherein enabling at least the second detector comprises: switching on at least the second detector or adjusting at least the second detector from a lower energy consumption mode to a higher energy consumption mode, and wherein enabling at least the second detector is responsive to detecting, using the first detector, the predefined first phase of the predefined user gesture.

\* \* \* \* \*